US012352422B2

(12) United States Patent
Porciatti

(10) Patent No.: US 12,352,422 B2
(45) **Date of Patent: *Jul. 8, 2025**

(54) T-BAR FOR SUSPENDED CEILING WITH HEAT DISSIPATION SYSTEM FOR LED LIGHTING

(71) Applicant: JLC-Tech IP, LLC, St. Petersburg, FL (US)

(72) Inventor: Silvio Porciatti, Pembroke, MA (US)

(73) Assignee: JLC-TECH LLC, Pembroke, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,155

(22) Filed: Aug. 21, 2023

(65) Prior Publication Data

US 2023/0392778 A1 Dec. 7, 2023

Related U.S. Application Data

(63) Continuation of application No. 17/526,701, filed on Nov. 15, 2021, now Pat. No. 11,732,878, which is a (Continued)

(51) Int. Cl.

*F21V 29/76* (2015.01)
*E04B 9/00* (2006.01)

(Continued)

(52) U.S. Cl.

CPC ............ *F21V 29/767* (2015.01); *E04B 9/006* (2013.01); *E04B 9/067* (2013.01); *F21S 4/28* (2016.01); *F21V 23/023* (2013.01); *F21V 23/026* (2013.01); *F21V 29/763* (2015.01); *F21V 33/006* (2013.01); *F24F 3/056* (2013.01); *E04B 9/064* (2013.01); *F21S 2/005* (2013.01); *F21S 8/02* (2013.01); *F21S 8/026* (2013.01); *F21S 8/04* (2013.01); *F21S 8/043* (2013.01);

(Continued)

(58) Field of Classification Search

CPC .......... E04B 9/006; E04B 9/064; E04B 9/067; F21S 2/005; F24F 3/056

See application file for complete search history.

(56) References Cited

U.S. PATENT DOCUMENTS 1,913,377 A 6/1933 Dorey
D162,843 S 4/1951 Klein (Continued)

FOREIGN PATENT DOCUMENTS

KR 200447421 Y1 1/2010

*Primary Examiner* — Zheng Song
(74) *Attorney, Agent, or Firm* — Thompson Coburn LLP

(57) ABSTRACT

The T-bar includes an elongate rigid spine extending between terminal ends including, in some embodiments, either a fixed anchor or adjustable anchor for attachment to adjacent T-bars or other supports. An upper heat sink is provided on an upper portion of the spine to enhance heat transfer from the T-bar to air surrounding upper portions of the T-bar. A light housing is provided on a lower portion of the T-bar which is configured to support a lighting module therein, such as a light emitting diode (LED) light. A lower heat sink is provided above this light housing and integrated into a rest shelf which supports ceiling tiles adjacent the T-bar. A power supply is provided which can be removably attached to the T-bar and provide appropriately conditioned power for the lighting module.

20 Claims, 3 Drawing Sheets

Related U.S. Application Data continuation of application No. 16/715,305, filed on Dec. 16, 2019, now Pat. No. 11,175,031, which is a continuation of application No. 15/863,276, filed on Jan. 5, 2018, now Pat. No. 10,508,805, which is a continuation of application No. 13/634,219, filed as application No. PCT/US2011/000455 on Mar. 10, 2011, now Pat. No. 9,879,850, which is a continuation of application No. 12/661,252, filed on Mar. 11, 2010, now Pat. No. 8,177,385.

(51) Int. Cl.

| | |
|---|---|
| ***E04B 9/06*** | (2006.01) |
| ***F21S 4/28*** | (2016.01) |
| ***F21V 23/02*** | (2006.01) |
| ***F21V 33/00*** | (2006.01) |
| ***F24F 3/056*** | (2006.01) |
| *F21S 2/00* | (2016.01) |
| *F21S 8/02* | (2006.01) |
| *F21S 8/04* | (2006.01) |
| *F21V 29/503* | (2015.01) |
| *F21V 29/74* | (2015.01) |
| *F21Y 105/10* | (2016.01) |
| *F21Y 115/10* | (2016.01) |

(52) U.S. Cl.

CPC ............. *F21V 29/503* (2015.01); *F21V 29/74* (2015.01); *F21V 33/0088* (2013.01); *F21Y 2105/10* (2016.08); *F21Y 2115/10* (2016.08)

(56) References Cited

U.S. PATENT DOCUMENTS

| | | | | |
|---|---|---|---|---|
| 4,126,971 | A | 11/1978 | Macuga et al. | |
| 4,230,900 | A * | 10/1980 | Speet | H02G 3/0493 362/431 |
| 4,747,246 | A * | 5/1988 | Sanborn | E04B 9/068 52/506.07 |
| 4,794,745 | A | 1/1989 | Platt et al. | |
| 4,972,339 | A | 11/1990 | Gabrius | |
| D315,832 | S | 4/1991 | Rocheleau et al. | |
| D338,449 | S | 8/1993 | Sahyoun | |
| 5,313,759 | A | 5/1994 | Chase, III | |
| 5,454,756 | A | 10/1995 | Ludwig | |
| 5,613,759 | A | 3/1997 | Ludwig et al. | |
| 5,687,525 | A | 11/1997 | Koski et al. | |
| 5,687,527 | A | 11/1997 | Bikard et al. | |
| D394,595 | S | 5/1998 | Walsh | |
| 5,848,833 | A | 12/1998 | Margulies et al. | |
| 5,937,605 | A | 8/1999 | Wendt | |
| 6,047,511 | A | 4/2000 | Lehane et al. | |
| 6,190,198 | B1 | 2/2001 | Ray | |
| 6,220,721 | B1 | 4/2001 | Chan et al. | |
| D445,211 | S | 7/2001 | Baker | |
| D488,243 | S | 4/2004 | Babka et al. | |
| 6,851,238 | B2 | 2/2005 | Rebman | |
| 7,383,670 | B1 | 6/2008 | Meyers | |
| D581,376 | S | 11/2008 | Shaner | |
| 7,621,497 | B2 | 11/2009 | Wallace | |
| D606,501 | S | 12/2009 | Plonski et al. | |
| D616,568 | S | 5/2010 | Desrosiers et al. | |
| D627,095 | S | 11/2010 | Miyairi et al. | |
| D649,684 | S | 11/2011 | Trzesniowski | |
| D649,685 | S | 11/2011 | Trzesniowski | |
| D649,686 | S | 11/2011 | Trzesniowski | |
| D649,687 | S | 11/2011 | Trzesniowski | |
| D649,688 | S | 11/2011 | Trzesniowski | |
| D649,693 | S | 11/2011 | Trzesniowski | |
| 8,061,865 | B2 | 11/2011 | Piepgras et al. | |
| D651,739 | S | 1/2012 | Trzesniowski | |
| D652,568 | S | 1/2012 | Trzesniowski | |
| D652,569 | S | 1/2012 | Trzesniowski | |
| D652,985 | S | 1/2012 | Trzesniowski | |
| D652,986 | S | 1/2012 | Trzesniowski | |
| 8,177,385 | B2 | 5/2012 | Porciatti | |
| D662,255 | S | 6/2012 | Klu | |
| D662,256 | S | 6/2012 | Klu | |
| D662,653 | S | 6/2012 | Hochman | |
| 8,459,824 | B1 | 6/2013 | Esmailzadeh et al. | |
| D782,104 | S | 3/2017 | Klus | |
| D782,106 | S | 3/2017 | Porciatti | |
| 9,746,142 | B2 | 8/2017 | Narendran et al. | |
| 9,879,850 | B2 | 1/2018 | Porciatti | |
| 9,883,267 | B2 | 1/2018 | Porciatti | |
| D818,186 | S | 5/2018 | Trzesniowski | |
| D818,187 | S | 5/2018 | Trzesniowski | |
| D818,188 | S | 5/2018 | Trzesniowski | |
| 2003/0021116 | A1 | 1/2003 | Miller et al. | |
| 2003/0081419 | A1 | 5/2003 | Jacob et al. | |
| 2004/0095771 | A1 | 5/2004 | McDonald | |
| 2004/0213003 | A1* | 10/2004 | Lauderdale | F21S 2/00 362/404 |
| 2005/0152132 | A1 | 7/2005 | Bernhart et al. | |
| 2006/0262521 | A1* | 11/2006 | Piepgras | F21V 29/70 362/404 |
| 2008/0266843 | A1 | 10/2008 | Villard | |
| 2009/0147504 | A1 | 6/2009 | Teeters | |
| 2009/0316391 | A1 | 12/2009 | Huang et al. | |
| 2011/0058376 | A1 | 3/2011 | Lin et al. | |
| 2011/0075416 | A1 | 3/2011 | Chou et al. | |
| 2011/0080746 | A1 | 4/2011 | Patti | |
| 2011/0103043 | A1 | 5/2011 | Ago et al. | |
| 2011/0222270 | A1 | 9/2011 | Porciatti | |
| 2011/0247284 | A1* | 10/2011 | Butcher, Jr. | E04B 9/067 52/506.05 |
| 2013/0039042 | A1 | 2/2013 | Kotovsky et al. | |
| 2013/0323950 | A1 | 12/2013 | Gingrich, III et al. | |
| 2014/0268755 | A1 | 9/2014 | Kotovsky et al. | |
| 2016/0076746 | A1 | 3/2016 | Porciatti | |
| 2017/0356603 | A1 | 12/2017 | Narendran et al. | |
| 2018/0128475 | A1 | 5/2018 | Porciatti | |

* cited by examiner 10
40
16
14
16
12
A
30
60
20

42
46
44
48
A
32
36
34
35
37
30
50
40
42
46
44
48
20
22
12
26
24
50
10

42
40
44
46
44
48
12
68
66
66
62
64
64
60
68
52
54
54
58
58
56
56
50
10

T-BAR FOR SUSPENDED CEILING WITH HEAT DISSIPATION SYSTEM FOR LED LIGHTING

CROSS-REFERENCE TO RELATED APPLICATIONS

This application is a continuation of U.S. patent application Ser. No. 17/526,701 filed Nov. 15, 2021, now U.S. Pat. No. 11,732,878; which is a continuation of U.S. patent application Ser. No. 16/715,305 filed on Dec. 16, 2019, now U.S. Pat. No. 11,175,031; which is a continuation of U.S. patent application Ser. No. 15/863,276 filed on Jan. 5, 2018, now U.S. Pat. No. 10,508,805; which is a continuation of U.S. patent application Ser. No. 13/634,219 filed on Sep. 11, 2012, now U.S. Pat. No. 9,879,850; which is a continuation and claims benefit of the earlier filing dates associated with International Application No. PCT/US2011/000455 filed on Mar. 10, 2011, which designates the United States and other countries; and is a continuation of U.S. patent application Ser. No. 12/661,252 filed on Mar. 11, 2010 and issued as U.S. Pat. No. 8,177,385 on May 15, 2012, which was claimed for priority in the above-identified international application, the entire disclosures of each application herein are incorporated by reference.

FIELD OF THE INVENTION

The following invention relates to T-bars for use in supporting ceiling tiles within a suspended ceiling. More particularly, this invention relates to T-bars which include lighting supported therefrom, and particularly LED lighting, with the T-bar configured to include a heat sink for dissipating heat generated by the light source.

BACKGROUND OF THE INVENTION

A common form of surface finish for ceilings, especially within commercial construction is the “dropped ceiling.” With a dropped ceiling a lattice of T-bars is suspended at a height desired for the ceiling. Ceiling tiles are provided which have a size and shape matching gaps in this lattice of T-bars. These ceiling tiles are placed within these gaps to fill these gaps between the T-bars. The T-bars generally have a shape with a vertically extending spine portion and a horizontally extending rest shelf so that the T-bar is generally in the form of an upside down “T.”

Lighting for interior building spaces can be provided in a variety of different ways. Often the most effective lighting for an interior space is overhead lighting. In a commercial environment where rooms are typically quite large, it is often advantageous to suspend lighting from the ceiling or embed lighting within the ceiling. When the ceiling includes a “dropped ceiling” arrangement, often some of the gaps in the lattice of T-bars are filled with lighting bays. For instance, fluorescent light tubes can reside within lighting bays that are sized to fill typical gaps within the T-bar lattice. Thus, rather than place a ceiling tile within certain gaps, lighting bays are installed.

An important consideration in the design and construction of buildings is the energy utilized by such buildings. One major factor in energy consumption of a building is the efficiency with which the space is heated and cooled. When the space utilizes a dropped ceiling, typically the conditioned space is only that space below the ceiling tiles of the “dropped ceiling.” Heating, ventilating and air conditioning (HVAC) ducts can be mounted in gaps between T-bars within the lattice forming the dropped ceiling in place of a ceiling tile, to deliver conditioned air into the conditioned space within the building. Space above the dropped ceiling typically has an undesirably hot or cold temperature compared to the conditioned space below. To enhance the effectiveness of HVAC systems in such buildings, ceiling tiles typically have a degree of resistance to heat transfer therethrough, such that temperature differentials between space above the dropped ceiling and conditioned space below the dropped ceiling can be efficiently maintained.

An additional source of power consumption within a building is the power consumed by lighting. Not only does lighting within a building directly affect energy consumption due to the power utilized to drive the light sources, but also lighting often generates significant heat within the conditioned space which then must be transferred from the space when the space is experiencing an unacceptably high temperature. Prior art attempts to reduce the energy consumption associated with lighting have included use of lower power higher efficiency lighting sources, such as fluorescent lighting and light emitting diode (LED) lighting. Beneficially, such alternative lighting sources both require less power to drive the light sources, and also typically generate less heat, minimizing heat sources which the HVAC systems of the building thus need to contend with. LED lighting also typically has a longer life than other lighting technologies.

One problem that is generated by utilization of LED lightings in particular, is that while a relatively low amount of heat is generated by the LED lighting, this heat is concentrated in a particularly small space directly adjacent the LED electronics required to generate the light. A major factor in the operating life of such LED lighting is the degree to which this heat can be effectively dissipated to avoid excessive heating of the electronics associated with the LED and other components of the LED which experience a shorter operational life when excess temperatures are experienced. Accordingly, a need exists for heat management associated with LED lighting, particularly when LED lighting is incorporated into a dropped ceiling of a building. Secondarily, other light sources and other sources of heat can benefit from having heat associated therewith transferred out of the conditioned space within a building, rather than the heat adding to the heat load within the conditioned space and requiring additional load on the HVAC equipment within the building.

SUMMARY OF THE INVENTION

With this invention, a T-bar is provided for a dropped ceiling which is configured to transfer heat effectively away from T-bar and ceiling mounted light sources and other heat sources, and into a space above a dropped ceiling. The T-bar can have any of a variety of different general cross-sections including a spine and a rest shelf at a lower end of the spine. Anchors are provided at terminal ends of the T-bar for attachment of ends of the T-bar within a conventional dropped ceiling system. For instance, the T-bar anchors can attach to adjacent T-bars or other supports in the forming of an entire lattice of T-bars within an existing conventional dropped ceiling system. A lower portion of the T-bar and beneath the rest shelf includes a light housing which can contain a lighting module therein. In a preferred form of this invention this lighting module includes at least one light emitting diode (LED) light source therein. An upper heat sink is coupled to the spine. This upper heat sink includes fins with gaps between the fins to enhance a rate of heat transfer between the heat sink and air adjacent the upper heat sink and above the ceiling tiles.

The T-bar preferably also includes a lower heat sink in the form of fins extending from the rest shelf. Preferably these fins include an outer fin and short fins closer to the spine than the outer fin. The outer fin is preferably longer than the short fins. In this way, an air pathway is provided from gaps between the fins of the lower heat sink and a ceiling tile resting upon the outer fin, for effective natural convection heat transfer away from the lower heat sink. The lower heat sink and light housing, as well as the spine and upper heat sink are preferably each formed together from a unitary mass of material to maximize heat transfer from the LED or other heat source to the heat sinks and then to the air within the space above the dropped ceiling. The entire T-bar is formed of a material having a higher than average thermal conductivity so that efficient heat transfer away from the LED or other heat source is accomplished.

A power supply for the LED is configured to be attachable to the upper heat sink so that a complete assembly for powering the LED lighting within the T-bar is suspended from the T-bar within the dropped ceiling system. By placing the lighting suspended from a lower surface of the T-bar, gaps within the T-bar lattice of the dropped ceiling system that would otherwise contain lighting can contain additional ceiling tiles to further enhance a resistance to heat transfer through the dropped ceiling to enhance an overall efficiency of the space conditioned by the HVAC system. Also, the aesthetic appearance of the ceiling can be enhanced by eliminating breaks in the ceiling for large prior art lighting bays. For instance, an entire ceiling of uniform ceiling panels can be provided, including the option to provide unique regular patterns, such as alternating colors in a checkered pattern.

OBJECTS OF THE INVENTION

Accordingly, a primary object of the present invention is to provide a T-bar which supports a light source on a lower side thereof and which includes a heat sink on an upper portion thereof to dissipate heat from the light source.

Another object of the present invention is to provide a T-bar with included heat dissipation structures to dissipate heat from a heat source adjacent a lower surface of the T-bar.

Another object of the present invention is to provide a method for drawing heat away from a light source on a lower portion of a T-bar of a dropped ceiling system.

Another object of the present invention is to provide a dropped ceiling system with T-bars that include lighting therein and associated heat dissipation structures for optimal lighting performance.

Another object of the present invention is to minimize energy utilized by a lighted building space.

Another object of the present invention is to provide lighting for a building space with a minimum power required.

Another object of the present invention is to provide a lighting system for a building space which is easy and inexpensive to install and which exhibits a long life.

Another object of the present invention is to provide a lighting system for a building which can easily be replaced and reconfigured.

Another object of the present invention is to provide an LED light source for mounting within a dropped ceiling of a building and which effectively dissipates heat from the LED light source for optimal service life.

Other further objects of the present invention will become apparent from a careful reading of the included drawing figures, the claims and detailed description of the invention.

DESCRIPTION OF THE PREFERRED EMBODIMENT

Figures 1, 2, 3:
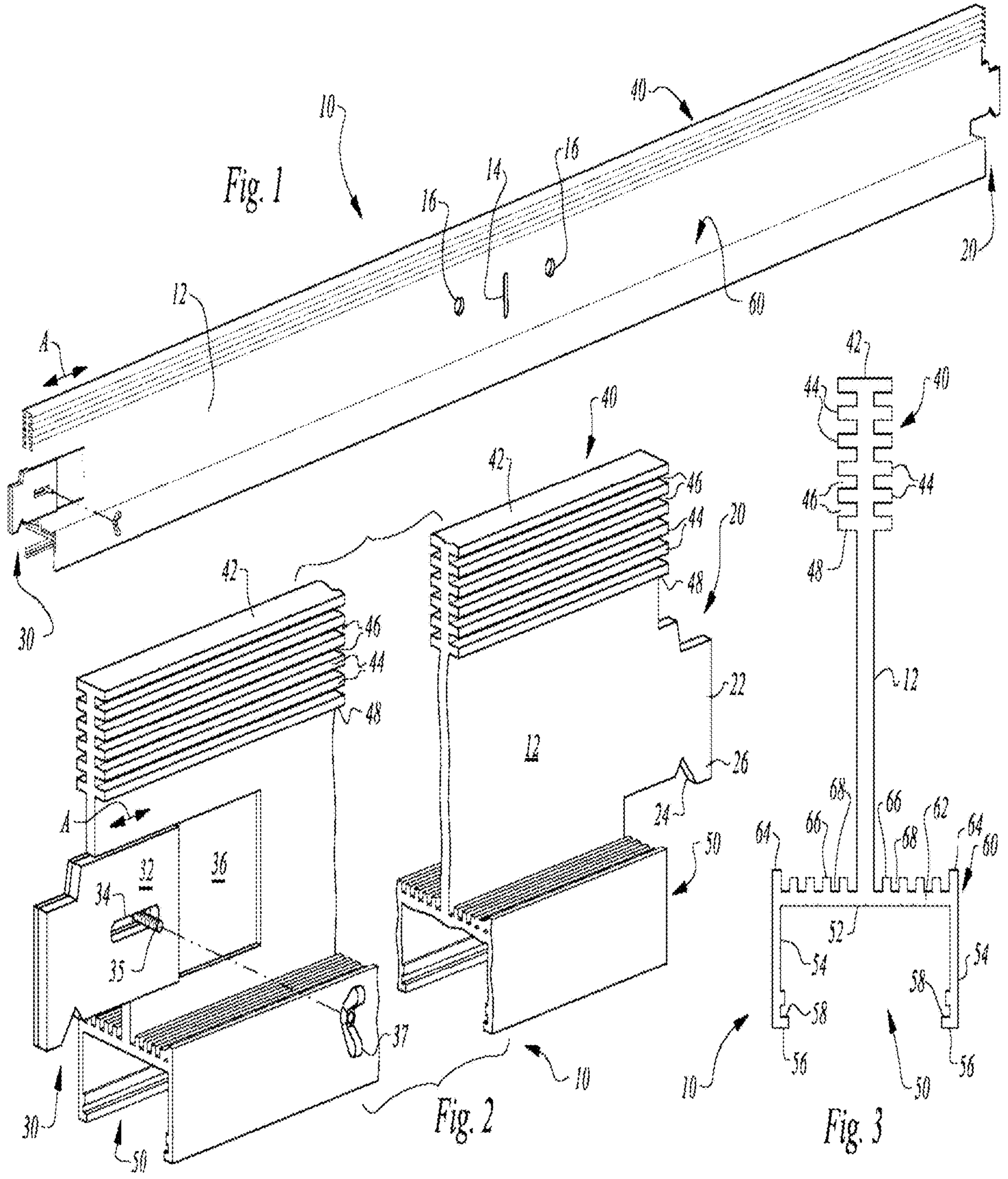
FIG. 1 is a perspective view of a T-bar according to a preferred embodiment of this invention configured to include lighting mounted to a lower portion thereof and with heat dissipating structures above the light source.
FIG. 2 is a detail of that which is shown in FIG. 1 and with central portions of the T-bar cut away.
FIG. 3 is a full sectional view of the T-bar of FIGS. 1 and 2.

Referring to the drawings, wherein like reference numerals represent like parts throughout the various drawing figures, reference numeral 10 is directed to a T-bar (FIG. 1) forming a portion of a dropped ceiling system (FIG. 5) with the T-bar including a lighting module 70 (FIGS. 4, 5, 8 and 9) coupled to a lower end of the T-bar 10 for providing lighting in a space below the dropped ceiling system. The T-bar 10 includes heat dissipating structures including an upper heat sink 40 and lower heat sink 60 in this preferred embodiment for dissipating heat from the lighting module 70 or other heat sources adjacent the T-bar 10.

In essence, and with particular reference to FIGS. 1-3, basic details of the T-bar 10 and associated features of this invention are described, according to this most preferred embodiment. The T-bar 10 is an elongate rigid structure extending between terminal ends and preferably having a substantially constant contour between the two terminal ends of the T-bar 10. A fixed anchor 20 is located at one of the terminal ends of the T-bar 10. An adjustable anchor 30 is provided at the opposite terminal end of the T-bar 10. The adjustable anchor 30 can be adjusted in length slightly (arrow A of FIGS. 1 and 2). The anchors allow the T-bar 10 to be connected to adjacent T-bars or other suspension structures, with the adjustable anchor 30 facilitating the process of attaching and detaching the T-bar 10 to adjacent structures, typically standard conventional prior art T-bars within a conventional dropped ceiling system.

The T-bar 10 includes an upper heat sink 40 on an upper portion of the T-bar 10. This upper heat sink 40 is adapted to efficiently transfer heat away from the T-bar 10 to air surrounding upper portions of the T-bar 10. A lower portion of the T-bar 10 preferably supports a light housing 50. This light housing 50 is configured to be located below a dropped ceiling of which the T-bar 10 is a part, with the light housing 50 adapted to hold a lighting module 70 therein, such as a light emitting diode (LED) lighting module 70. Preferably, a lower heat sink 60 is also provided on the T-bar 10. This lower heat sink 60 is preferably built into a rest shelf 62 of the T-bar 10 which also functions to hold edges of ceiling tiles C (FIGS. 4 and 5) adjacent the T-bar 10. A power supply 80 is provided (FIGS. 6 and 7) which can be attached to the T-bar 10, such as by removable attachment in a manner gripping the upper heat sink 40. The T-bar 10 thus supports the ceiling tiles C and also is configured to include lighting therein and adapted to transfer heat away from lighting or other structures adjacent lower portions of the T-bar 10 and to also support a power supply 80 for the lighting.

More specifically, and with continuing reference to FIGS. 1-3, particular details of the structure of the T-bar 10 itself are described, according to this most preferred embodiment. The T-bar 10 is preferably a rigid elongate structure formed of aluminum. Most preferably, the T-bar 10 is extruded so that it has a constant cross-sectional form (FIG. 3) including the various features provided by the preferred embodiment of this invention.

The T-bar 10 could be formed of other materials, with emphasis placed on the ability of the material to facilitate conduction heat transfer therethrough, and also have desirable weight and strength characteristics to operate as a portion of a dropped ceiling system. Other materials which might be suitable in some circumstances include steel. It is also conceivable that the T-bar 10 could be formed of separate components attached together, with the separate components either being made of a common material or from different materials. If the different portions of the T-bar 10 are formed of different materials and different subassemblies, these subassemblies are preferably fixedly held adjacent each other such that the T-bar 10 functions primarily as a single unit.

Figure 5:
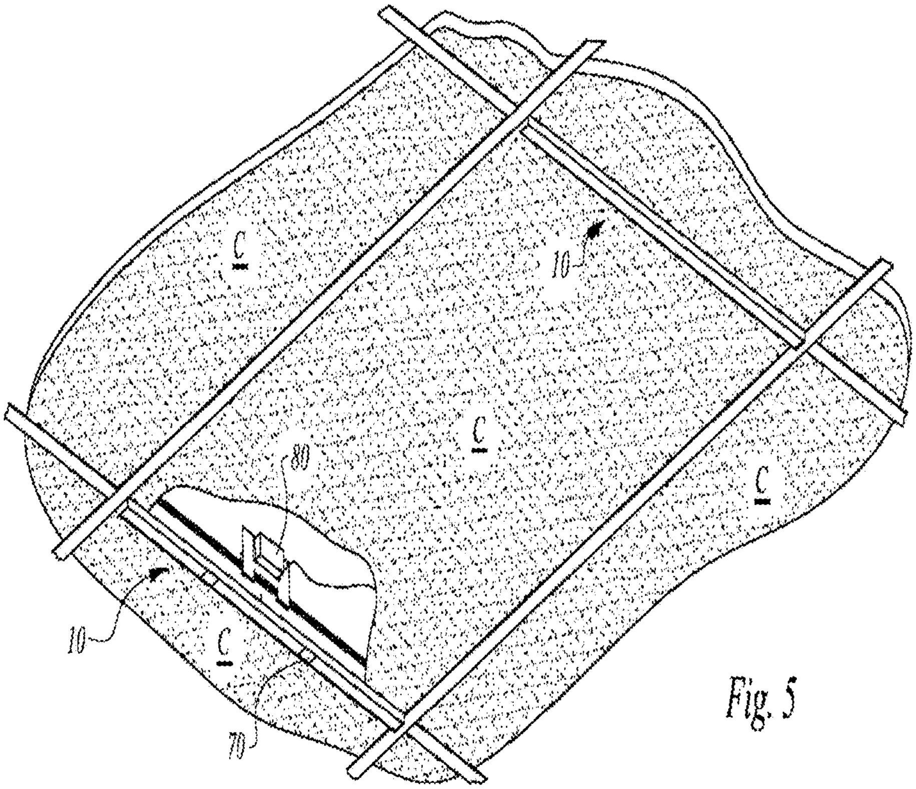
FIG. 5 is a perspective view of a dropped ceiling system including the T-bar of this invention and with a portion of a ceiling tile cut away to reveal portions of the T-bar above the dropped ceiling, as well as a power supply coupled to the T-bar and for supplying electric power to the lighting according to this invention.

The cross-section of the T-bar 10 generally includes a spine 12 which is preferably a somewhat thin planar structure which extends substantially vertically up from a rest shelf 62. The spine 12 and rest shelf 62 together form an inverted "T" to generally form the T-bar 10. The spine 12 preferably includes a slot 14 near a midpoint thereof, and potentially at other portions passing through the spine 12. The slot 14 is configured to receive tabs 22 of adjacent T-bars 10 that might be suspended from the slot 14 in the T-bar 10 to complete the dropped ceiling. Suspension holes 16 also preferably pass through the spines 12. These suspension holes 16 can accommodate wires or other suspension lines which extend up to anchor points above the dropped ceiling so that the suspension holes 16 act to support the entire dropped ceiling in a desired position (FIG. 5). Additional suspension holes 16 can be provided if required.

The T-bar 10 in this embodiment is approximately two feet long. In other embodiments, the T-bar 10 could be longer (or shorter) but preferably has a contour similar to that disclosed in FIGS. 1-3 regardless of the length of the T-bar 10. Another standard size for the T-bar 10 would typically be four feet. Conceivably in particularly long lengths, the T-bar 10 might be slightly changed in geometry to have the structural strength required to remain rigid over such long spans. Other modifications to the T-bar 10 can be made consistent with known techniques for T-bar modification within the dropped ceiling T-bar art.

With particular reference to FIG. 2, details of the fixed anchor 20 and adjustable anchor 30 for the terminal ends of the T-bar 10 are described, according to this preferred embodiment. While the T-bar 10 could conceivably include two fixed anchors 20 or two adjustable anchors 30, preferably the T-bar 10 includes one fixed anchor 20 and one adjustable anchor 30. The fixed anchor 20 includes a tab 22 defining a thin axial extension from the spine 12 sized to fit within the slot 14 of another T-bar. A lower portion of this tab 22 is preferably configured with a lower notch 24. A tooth 26 preferably is provided beyond the lower notch 24 and defines a portion of the tab 22 lower than other portions of the tab 22. Taken together, the tab 22 with the lower notch 24 and tooth 26 allow the fixed anchor 20 to pass through a slot 14 or other related support structure with the tooth 26 hanging down beyond the slot 14 and with the lower notch 24 straddling the slot 14, so that the tab 22 is generally held within the slot 14. To remove the fixed anchor 20 from within the slot 14, a user would lift slightly on the T-bar 10 and then translate the tab 22 of the fixed anchor 20 out of the slot 14 by translating the entire T-bar 10.

When the end of the T-bar 10 opposite the fixed anchor 20 is positioned so that it cannot be readily moved, it is desirable to utilize an adjustable anchor 30 on at least one end of the T-bar 10. With the adjustable anchor 30, the tab 22 can be removed from one of the terminal ends of the T-bar 10 even when each end of the T-bar 10 is positioned where it cannot be translated linearly axial to an elongate axis of the T-bar 10 due to constraints adjacent ends of the T-bar 10.

In particular, and in this exemplary embodiment, the adjustable anchor 30 preferably has a form similar to the fixed anchor 20, except that the tab 22 is capable of translating horizontally and axially along a long axis of the T-bar 10 (along arrow A of FIGS. 1 and 2). The adjustable anchor 30 is preferably mounted on a plate 32. This plate 32 includes a slot 34 therein and resides within a recess 36 at an end of the spine 12, adjacent the terminal end having the adjustable anchor 30 thereon. The recess 36 defines a portion of the spine 12 of only partial thickness within which the plate 32 resides. A threaded shaft 35 passes through the slot 34 and is fixed to the spine 12. This slot 34 can slide relative to the threaded shaft 35 so that the adjustable anchor 30 is allowed to translate linearly in a horizontal direction, but is restrained from other motion.

A wing nut 37 or other fastener is preferably provided which can attach to the threaded shaft 35 and affix the adjustable anchor 30 in any given position relative to the slot 34. Thus, for instance, when the T-bar 10 is to be removed from an adjacent T-bar, the wing nut 37 of the adjustable anchor 30 is loosened. Next, the adjustable anchor 30 is allowed to translate with the slot 34 sliding over the threaded shaft 35 until the tab 22 associated with the adjustable anchor 30 has been moved out of the slot 14 in which it is anchored. The entire T-bar 10 can then be translated in a downward direction. The T-bar 10 can then be replaced with a replacement T-bar of any variety. The adjustable anchor 30 can be modified to connect within other existing ceiling systems. In such other ceiling systems the fixed anchor 20 could also be modified to attach within such systems.

Figure 4:
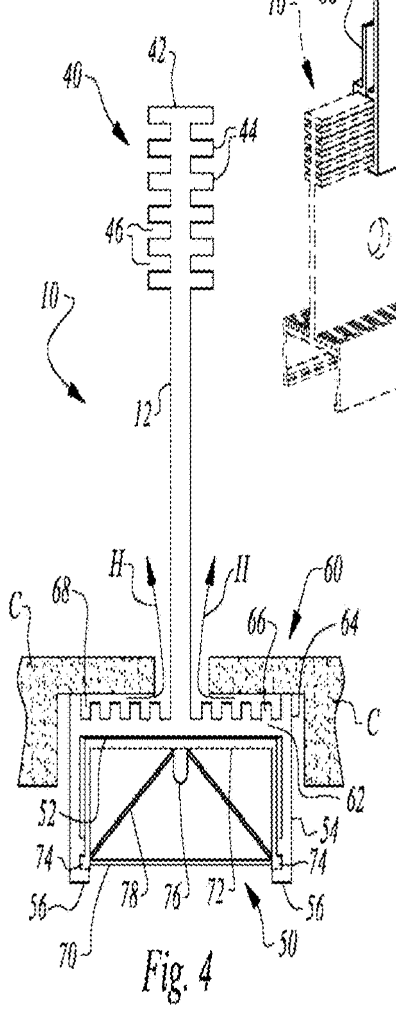
FIG. 4 is a full sectional view similar to that which is shown in FIG. 3 but with included ceiling panels resting upon the T-bar and a lighting module located within a light housing of the T-bar.

With particular reference to FIGS. 2-4, particular details of the upper heat sink 40 of the T-bar 10 are described, according to this most preferred embodiment. The T-bar 10 is preferably configured with the upper heat sink 40 formed and positioned to efficiently transfer heat from the T-bar 10 to air space adjacent upper portions of the T-bar 10. To facilitate such heat transfer, the upper heat sink 40 is provided. By enhancing a surface area of the T-bar 10 adjacent the upper heat sink 40, natural convection is accelerated so that heat is drawn away from the T-bar 10 more rapidly.

Conduction heat transfer between a lighting module 70 adjacent a lower end of the T-bar 10 can thus more effectively occur through the T-bar 10, to the upper heat sink 40. Convection heat transfer then effectively moves the heat from the heat sink 40 out to air surrounding the upper heat sink 40, to minimize temperature increase of the lighting module 70 and enhance its operating longevity. Also, with LED lighting, such temperature reduction causes the lighting module 70 to most efficiently convert electric power to light, enhancing the efficiency with which the lighting module 70 operates.

The upper heat sink 40 includes at least one fin, but most preferably includes a series of fins extending laterally from each side of an upper end of the spine 12. In the embodiment shown, six fins 44 extend laterally from each side of the spine 12, between an upper end 42 and a lower end 48. Lateral gaps 46 are provided between the adjacent lateral fins 44. Air within the lateral gaps 46 is heated and then passes out of the lateral gaps 46 by natural convection, being replaced by cooler air which is then heated and travels out by natural convection, with this process continuing so that natural convection heat transfer accelerates removal of heat from the T-bar 10 through the upper heat sink 40.

The upper heat sink 40 also acts as a portion of the T-bar 10 which conveniently facilitates attachment of the power supply 80 associated with the lighting module 70 to be mounted to the T-bar 10 in a convenient and reliable manner, as described in detail below.

With continuing reference to FIGS. 2-4, details of the light housing 50 of this invention are described according to this most preferred embodiment. The light housing 50 defines a portion of the T-bar 10 which is particularly configured to contain a lighting module 70 therein, such as a light emitting diode (LED) lighting module 70. The light housing 50 could have a variety of different configurations with the configurations shown here merely being one such effective configuration.

The light housing 50 is preferably rigid in form and shaped along with the other portions of the T-bar 10 as a single unitary mass of material. This light housing 50 includes a top wall 52 which is preferably planar and extends substantially horizontally and acts as an underside of the rest shelf 62 upon which ceiling tiles C are positioned. Side walls 54 extend down from front and back edges of the top wall 52. These side walls 54 are preferably parallel with each other and substantially mirror images of each other. Tips 56 of the side walls 54 define lowermost portions of this light housing 50, with a light supporting space therebetween.

Track slots 58 are preferably provided in the side walls 54 adjacent the tips 56. These track slots 58 can help to hold and direct into the light housing 50 a lighting module 70, such as that described and shown in FIG. 4, including a light element 76 that is preferably in the form of a light emitting diode (LED).

Figure 8:
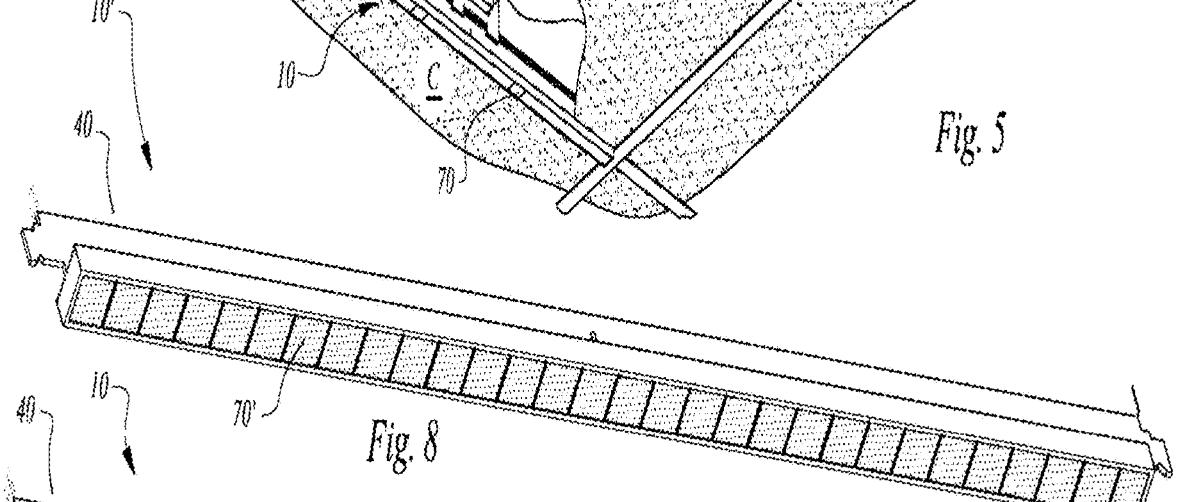
FIG. 8 is a perspective view of a T-bar with included lighting module according to an alternative embodiment featuring low intensity light emitting diode (LED) lighting technology.
Figure 9:
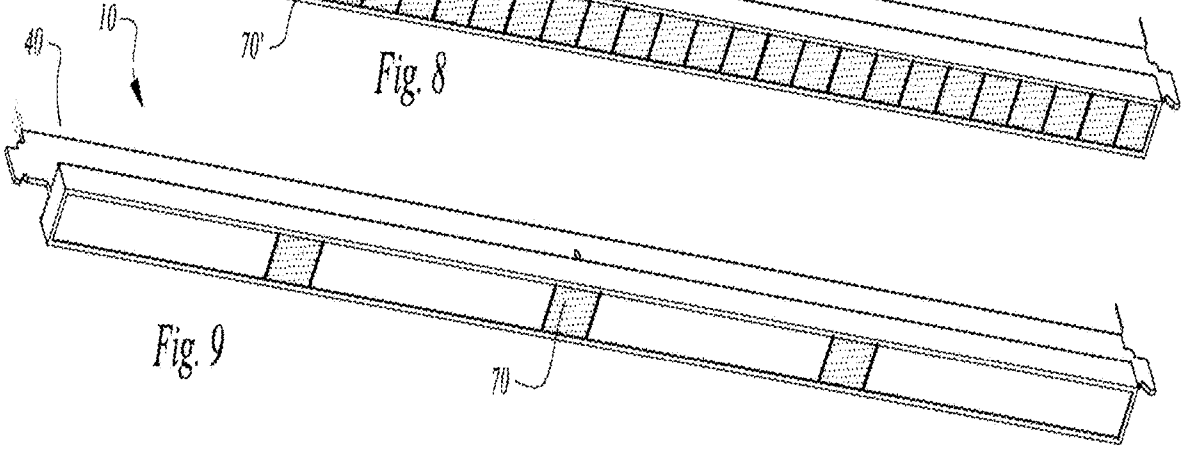
FIG. 9 is a perspective view of the T-bar of one form of this invention with included lighting module in the form of three high intensity light emitting diodes (LEDs), for example.

The lighting module 70 can be any of a variety of different kinds of lighting modules, but is most preferably an LED lighting module such as the low intensity lighting module 70' associated with the T-bar 10' (FIG. 8) or the high intensity lighting module 70 associated with the T-bar 10 shown in FIG. 9. In the embodiment of FIG. 8, thirty separate LEDs make up the low intensity lighting module 70. In the embodiment of FIG. 9, three high intensity LEDs provide the lighting module 70 and would typically provide a similar amount of light (if not more) than that supplied by the low intensity lighting module of FIG. 8. High intensity LEDs require an even greater amount of heat dissipation than low intensity LEDs for optimal life.

With further reference to FIG. 4, the particular details of the lighting module 70 preferably include an enclosure 72 which fits within the light housing 50 and includes side rails 74 which rest within the track slots 58 of the light housing 50 to support the lighting module 70 within the light housing 50. A light element 76 is included within the lighting module 70 as well as required electronics. A reflector 78 is preferably provided to optimally reflect most of the light down to the space below the lighting module 70.

Preferably, portions of the lighting module 70 including the enclosure 72 are formed of aluminum or other relatively high rate of heat transfer materials to optimize heat transfer from the light element 76 and associated electronics to the adjacent light housing 50 and other portions of the T-bar 10. The top wall 52 of the light housing 50 is configured to be directly adjacent upper portions of the enclosure 72 of the lighting module 70. In this way, conduction heat transfer can efficiently occur between the lighting module 70 and the light housing 50 of the T-bar 10.

Most preferably, the T-bar 10 includes a lower heat sink 60 in addition to the upper heat sink 40, but could optionally have only the upper heat sink 40 or only the lower heat sink 60. Additionally, further heat sinks could be attached to or formed with the T-bar 10, such as extending laterally from the spine 12 below the upper heat sink 40. The lower heat sink 60 includes a plurality of fins extending up from the rest shelf 62. These fins preferably include an outer fin 64 most distant from the spine 12 and short fins 66 between the outer fins 64 and the spine 12. Vertical gaps 68 are provided between the fins 64, 66.

While these fins 64, 66 generally act to enhance convection heat transfer, these fins 64, 66 also are preferably configured so that air between the fins 64, 66, and within the gaps 68 is not trapped, but rather can travel out (along arrow H of FIG. 4) of these gaps. By providing the outer fins 64 as tall fins, taller than the short fins 66, such a gap is provided for passage of air (along arrow H of FIG. 4) with the ceiling tile C resting upon the outer fin 64 and above the short fins 66. If required, portions of the ceiling tile C adjacent the rest shelf 62 could be adjusted geometrically and/or formed of alternate materials to ensure that this gap for heat transfer along arrow H is maintained.

Figure 6:
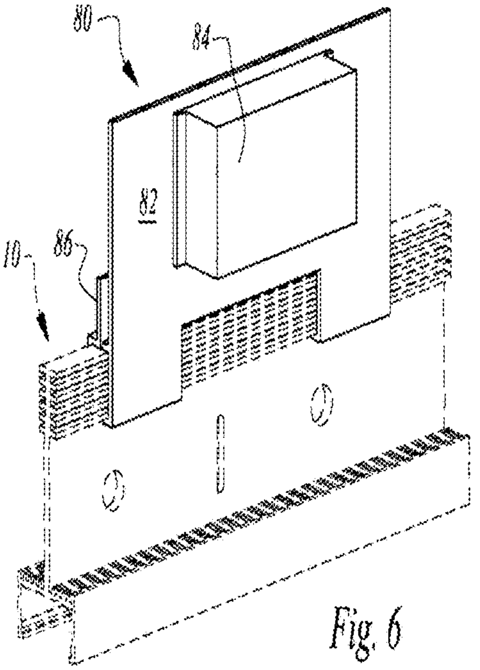
FIG. 6 is a perspective view of the power supply for supplying power to the light module of this invention, shown attached to the T-bar of FIG. 1, with the T-bar shown in broken lines.
Figure 7:
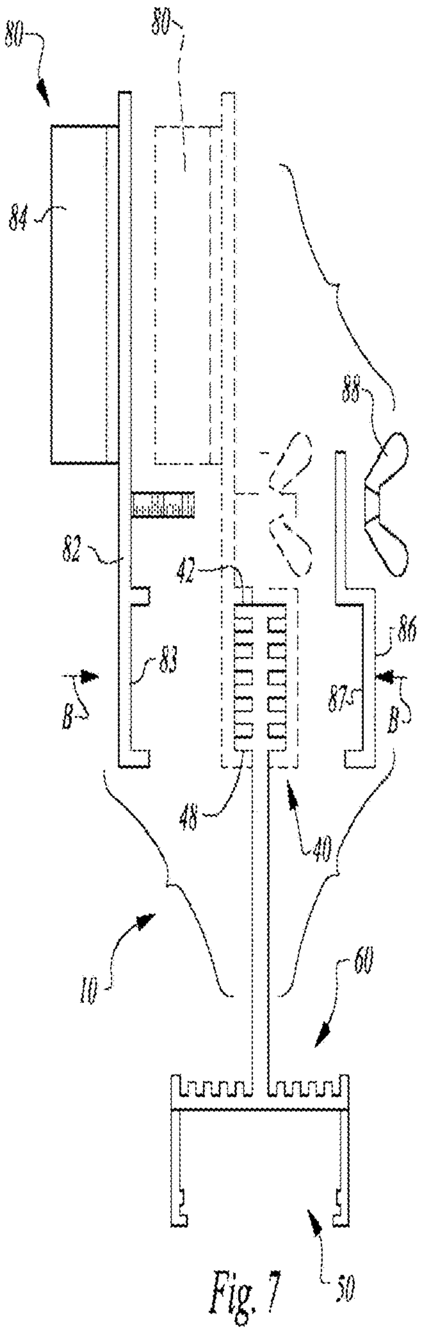
FIG. 7 is a sectional view of that which is shown in FIG. 6 and with the power supply exploded away from the T-bar and shown in phantom coupled to the T-bar to illustrate how the power supply is removably attachable to the T-bar.

With particular reference to FIGS. 5-7, details of the power supply 80 for conditioning and delivering power to the lighting module 70 and mounting the power supply 80 to the T-bar 10 are described, according to a most preferred embodiment. The light element 76 within the lighting module 70 typically requires electric power having a particular voltage, current and potentially cycle rate (for AC power) and perhaps other characteristics for optimal performance. The power supply 80 is preferably provided to transform available power into power having a form most optimal for powering the light source 76 within the lighting module 70. In the case of LED lighting, typically low voltage DC power is required. Often available power for the lighting is in the form of between 110 volt and 277 volt AC power. The power supply 80 in such a configuration would be primarily in the form of an AC to DC transformer with an output voltage matching that required for the LED lighting involved.

The power supply 80 is preferably generally provided as a module 84 in an enclosure that is mounted upon a plate 82 which is preferably substantially planar and configured to be aligned substantially coplanar with the spine 12. In this way, the power supply 80 and associated mounting hardware generally remain in an area directly above the T-bar 10 so that ceiling tiles C resting upon the T-bar 10 can still be readily moved off of the T-bar 10 to replace ceiling tiles C and to access space above the dropped ceiling.

A separate bracket 86 is preferably provided which is removably and adjustably attachable, such as through a fastener 88 to the plate 82. In one embodiment, this fastener 88 is in the form of a wing nut acting on a threaded shaft mounted to the plate 82. A channel 83 is preferably formed of a plate 82 and a channel 87 is preferably formed on the bracket 86. These channels 83, 87 are preferably complemental in form and facing each other. These channels 83, 87 preferably have a height similar of a height between the upper end 42 and lower end 48 of the upper heat sink 40. Thus, when the fastener 88 tightens the bracket 86 toward the plate 82, the channels 83, 87 can grip the upper heat sink 40 and hold the entire plate 82 and associated module 84 of the power supply 80 rigidly to the T-bar 10.

Wiring (FIG. 5) extends from a source of power down to the module 84 of the power supply 80. Additional wiring (not shown) would be routed from the module 84 down to the lighting module 70, such as through holes in the top wall 52 of the light housing 50, to provide power to the lighting module 70. It is conceivable that a single power supply 80 could be provided for each lighting module 70 of each T-bar 10, or a single power supply 80 could serve more than one lighting module 70 of multiple separate T-bars 10.

While the T-bar 10 of this preferred embodiment has been described in an embodiment where a lighting module is held within a light housing 50 of the T-bar 10, the T-bar 10 could support other structures which require heat dissipation, other than lighting, or lighting other than LED lighting. For instance, a fluorescent light bulb could be supported within the light housing 50 according to this invention. Other heat generating accessories desired to be mounted within the ceiling could also be mounted to the T-bar 10, for instance loud speakers could be fitted to lower portions of the T-bar 10 with heat dissipation provided by the various heat sinks 40, 60 of the T-bar 10 according to various different embodiments of this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together (or formed together) or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A T-bar for a suspended ceiling, the T-bar comprising:

an elongated rigid spine extending from a first terminal end to a second terminal end;

an anchor attached to the elongated rigid spine on at least one of the first or second terminal ends;

a lower portion of the elongated rigid spine including a first rest shelf portion and a second rest shelf portion, the first rest shelf portion extending from the elongated rigid spine in a first lateral direction, the second rest shelf portion extending from the elongated rigid spine in a second lateral direction, the second lateral direction being opposite the first lateral direction, the first and second rest shelf portions and elongated rigid spine forming a cross-sectional form of the T-bar from the first terminal end to the second terminal end, the cross-sectional form of the T-bar configured for placement of the suspended ceiling above the lower portion of the elongated rigid spine;

a lighting module extending from at least the first terminal end to at least the second terminal end of the elongated rigid spine, the lighting module located below the first and second rest shelf portions;

a first light supporting space associated with the first rest shelf portion;

a second light supporting space associated with the second rest shelf portion;

a first module support associated with the lighting module;

a second module support associated with the lighting module; and wherein placement of the first module support and the second module support with the first light supporting space and second light supporting space secures the lighting module below the first and second rest shelf portions of the T-bar.

2. The T-bar of claim 1, further comprising a second anchor located on the other of the first or second terminal ends of the elongated rigid spine.

3. The T-bar of claim 1, wherein the lighting module contains a lighting element of the lighting module.

4. The T-bar of claim 1, further comprising a first side wall extending downward from a bottom side of the first rest shelf portion and extending from the first terminal end of the first rest shelf portion to the second terminal end of the first rest shelf portion, and a second side wall extending downward from a bottom side of the second rest shelf portion and extending from the first terminal end of the second rest shelf portion to the second terminal end of the second rest shelf portion, the first and second side walls and the bottom sides of the first and second rest shelf portions forming a light housing to contain the lighting module.

5. The T-bar of claim 1, wherein the lighting module is contained within a light housing, the light housing positioned below the first and second rest shelf portions.

6. The T-bar of claim 1, wherein the first light supporting space and the second light supporting space are a slot design, the first module support and the second module support of the lighting module are a rail design, the rail design of the first and second module supports of the lighting module resting within the slot design of the first and second light supporting spaces.

7. A T-Bar with a light source for use in a suspended ceiling, the T bar with the light source comprising:

an elongated spine extending from a first terminal end to a second terminal end, the elongated spine being a planar structure with a first longitudinal edge and a second longitudinal edge extending between the first and second terminal ends;

a first rest shelf portion projecting outward from the first longitudinal edge of the elongated spine from a first lateral side of the elongated spine, wherein the first rest shelf portion is configured to support a first ceiling tile on the first rest shelf portion;

a second rest shelf portion projecting outward from the second longitudinal edge of the elongated spine from a second lateral side of the elongated spine, the second lateral side of the elongated spine facing a direction opposite the first lateral side of the elongated spine, wherein the second rest shelf portion is configured to support a second ceiling tile on the second rest shelf portion;

a plurality of anchors, each anchor located at each terminal end of the elongated spine and connectable to either a second T-bar with light source or a non-illuminating T-bar used for the suspended ceiling;

a lighting module extending from at least the first terminal end to at least the second terminal end of the elongated spine, the lighting module secured below the first and second rest shelf portions by a plurality of light supporting spaces associated with the first and second rest shelf portions; and wherein the lighting module contains a plurality of module supports, the plurality of module supports placeable with the plurality of light supporting spaces to secure the lighting module with the T-bar with the light source.

8. The T-bar with the light source of claim 7, wherein the plurality of module supports of the lighting module are a plurality of side rails, the plurality of side rails of the lighting module resting within the plurality of light supporting spaces below the first and second rest shelf portions of the T-bar with the light source.

9. The T-bar with the light source of claim 7, further comprising a power source connected to the lighting module to illuminate an area below the T-bar with the light source.

10. The T-bar with the light source of claim 9, wherein the power source is located remote from the T-bar with the light source and connected to the lighting module by wiring.

11. The T-Bar with the light source of claim 9, wherein the power source is attached to the elongated spine through use of a power source fastener.

12. The T-bar with the light source of claim 7, further comprising an upper heat sink having a greater surface area than the elongated spine, the upper heat sink formed adjacent to the first and second longitudinal edge of the elongated spine.

13. The T-bar with the light source of claim 12, wherein the upper heat sink comprises at least one fin protruding laterally from each the first and second lateral side of the elongated spine.

14. The T-bar with the light source of claim 7, wherein the lighting module contains a plurality of lighting elements creating the light source of the T-bar.

15. A T-bar for a suspended ceiling, the T-bar comprising:

an elongated spine extending from a first terminal end to a second terminal end, the elongated spine having an upper portion, a middle portion, and a lower portion, the upper portion having a greater surface area than the middle portion to draw heat away from the T-bar;

a first rest shelf portion constituting a first lower portion of the elongated spine, the first rest shelf portion extending from a first lateral side of the elongated spine;

a second rest shelf portion constituting a second lower portion of the elongated spine, the second rest shelf portion extending from a second lateral side of the elongated spine, the second lateral side of the elongated spine facing opposite the first lateral side of the elongated spine, wherein the first and second rest shelf portions and the elongated spine with the upper and middle portions create a cross sectional form of the T-bar, the cross-sectional form of the T-bar configured for placement of the suspended ceiling above the first and second rest shelf portions;

a light housing location, the light housing location positioned below the first and second rest shelf portions and below the elongated spine;

a lighting module extending from at least the first terminal end to at least the second terminal end of the elongated spine and having a lighting element, the lighting module secured into the light housing location by a plurality of light supporting spaces of the T-bar configured to accept the lighting module;

a power source, the power source connected to the lighting element to power the lighting module and illuminate an area below the T-bar; and wherein the lighting module contains a plurality of module supports, the plurality of module supports placeable with the plurality of light supporting spaces to secure the lighting module in the light housing location.

16. The T-bar of claim 15, wherein the upper portion of the elongated spine having a greater surface area than the middle portion of the elongated spine is an upper heat sink.

17. The T-bar of claim 16, further comprising at least one fin protruding laterally from at least one lateral side of the elongated spine to form the upper heat sink.

18. The T-bar of claim 15, wherein the plurality of module supports of the lighting module are a plurality of side rails, the plurality of side rails of the lighting module resting within the plurality of light supporting spaces to secure the lighting module in the light housing location.

19. The T-bar of claim 15, wherein the lighting module contains a plurality of lighting elements as the lighting element.

20. The T-bar of claim 15, further comprising a plurality of anchors, each anchor located at each terminal end of the elongated spine, the plurality of anchors connectable to either a second T-bar with light source or a non-illuminating T-bar used for the suspended ceiling.

* * * * *